United States Patent [19]

Noble et al.

[11] Patent Number: 5,591,972

[45] Date of Patent: Jan. 7, 1997

[54] APPARATUS FOR READING OPTICAL INFORMATION

[75] Inventors: J. Donald Noble, La Fayette; Michael M. Muehlemann, Liverpool, both of N.Y.

[73] Assignee: Illumination Technologies, Inc., East Syracuse, N.Y.

[21] Appl. No.: 509,758

[22] Filed: Aug. 3, 1995

[51] Int. Cl.$^6$ .................................................. H04N 1/04
[52] U.S. Cl. ........................................ 250/330; 250/334
[58] Field of Search ........................... 250/330, 334, 250/332, 333, 338.1, 339.05, 341.8; 340/933, 937

[56]  References Cited

U.S. PATENT DOCUMENTS

| | | | |
|---|---|---|---|
| 3,225,177 | 12/1965 | Stites et al. | 235/65.11 |
| 3,324,301 | 6/1967 | Goldberg | 250/223 |
| 3,690,233 | 9/1972 | Billingsley | 95/11 |
| 4,160,522 | 7/1979 | Dikinis | 235/454 |
| 4,368,979 | 1/1983 | Ruell | 356/71 |
| 4,970,389 | 11/1990 | Danforth et al. | 250/271 |
| 5,013,917 | 5/1991 | Ulich | 250/330 |
| 5,101,200 | 3/1992 | Swett | 340/937 |
| 5,204,675 | 4/1993 | Sekine | 340/933 |
| 5,311,012 | 5/1994 | Juds et al. | 250/222.1 |
| 5,359,185 | 10/1994 | Hanson | 235/472 |
| 5,408,099 | 4/1995 | Barr et al. | 250/330 |

Primary Examiner—David P. Porta
Assistant Examiner—Richard Hanig
Attorney, Agent, or Firm—Trapani & Molldrem

[57] ABSTRACT

Apparatus is disclosed for illuminating a distant object such as a vehicle license plate, and for reading optical information on the distant object. The apparatus is a self-contained, compact unit which includes a radiation source for illuminating a selected area of the object and a CCD camera for receiving radiation from the object and for producing an electrical signal representative of optical information on the object. The radiation source is coaxial with an imaging lens of the camera and includes arrays of LED's spaced around an optical axis passing through the imaging lens. The LED's emit radiation in the near infrared region and are strobed at a predetermined frequency during the acquisition of the information.

13 Claims, 2 Drawing Sheets

APPARATUS FOR READING OPTICAL INFORMATION

BACKGROUND OF THE INVENTION

This invention relates to apparatus for illuminating a distant object and for reading optical information contained on the distant object. More specifically, the invention relates to apparatus for reading information such as alpha-numeric information contained on a license plate of a vehicle.

A number of systems have been proposed for optically or electronically identifying motor vehicles in order to facilitate the flow of traffic in urban areas. Such a system can be used, for example, at an automatic toll station where a motorist simply drives through a designated lane and an electronic device reads and records his license plate number. This information can then be used to charge a toll to the motorist's account. Identification systems can also be used to control entry of vehicles to restricted areas and to detect vehicles which may have been stolen or used for illegal purposes. In the latter use, it is often desirable to use a system which is operable to obtain the information without detection by the motorist.

Various arrangements are known in the prior art for optically identifying vehicles. In U.S. Pat. No. 4,368,479, there is shown an automobile identification system for use with an automobile license plate containing alpha-numeric characters in combination with a hologram containing encoded information which cannot be decoded by the unaided eye. In reading the license plate, a measuring CO2 laser is used to irradiate the license plate, and the optical information in the reflected image is processed by a receiver to retrieve both the visible information and the information in the hologram. A problem with the patented apparatus is that a specially constructed license plate having a hologram must be used by a motorist for the system to work. A further problem is that the light source and receiving device are separate units which makes the system relatively complex and expensive.

Other systems are known for reading optical information on an object located at a distance from a recorder. The patent to Hansen, U.S. Pat. No. 5,359,185, discloses apparatus for reading a bar code over a substantial range of distances. The Hansen apparatus comprises an illumination source for illuminating the bar code with light and a CCD sensor array for converting the image information into an electrical signal. The illumination source is adapted to sequentially illuminate the bar code with light of varying wavelengths. A computer is used to decode images produced at the various wavelengths to find an image of sufficient focus. The elaborate ranging techniques disclosed in this patent are costly and are not needed in many applications, such as vehicle identification systems. A further disadvantage is that the apparatus uses visible light which makes it impractical for certain uses.

OBJECTS AND SUMMARY OF THE INVENTION

It is an object of the present invention to provide apparatus for reading optical information which overcomes the problems in the prior art discussed above and which is self-contained, compact, and relatively inexpensive.

Another object of the present invention is to provide apparatus for reading optical information which is useful for the secret acquisition of such information.

A further object of the present invention is provide apparatus for reading optical information having a radiation source which is efficient and is particularly suitable for intermittent operation.

A still further object is to provide a highly reliable method for recording information contained on a vehicle license plate.

In accordance with the above objects, apparatus is provided which includes arrays of light-emitting diodes (LED's) for irradiating an area on a distant object, for example, a license plate on a vehicle. The arrays of LED's are mounted on a distal end of a housing and are arranged around an optical axis which extends through an opening in the housing. The LED's emit radiation in the near infrared region, and a power supply for the LED's includes a pulse generator for strobing LED's at a predetermined frequency. A camera mounted in the housing is adapted to receive a beam of radiation from the object and to produce an electrical signal representative of the optical information on the object. The camera includes an imaging lens which is located on the optical axis and a CCD image sensor having a frame rate which can be equal to the strobe repetition frequency of the LED's.

A main advantage of the apparatus of the present invention is the arrangement of all of the apparatus elements coaxially in a self-contained, compact unit which can be easily concealed during use, if desired. The use of a radiation source which emits invisible radiation enhances the capability of the apparatus for the secret acquisition of information. A further advantage is that the disclosed apparatus is particularly suitable for intermittent operation, for example, an operation in which vehicle license plates are being read as the vehicles pass through a toll booth. The apparatus can also be used in many other acquisition/detection systems, such as for speed detection or at parking garages. Moreover, because invisible radiation is used, the apparatus can be operated occasionally, or else dummy or decoy units can be used, e.g., at toll plazas.

The above and many other objects, features, and advantages of this invention will become apparent from the ensuing description of a few selected preferred embodiments, which should be read in connection with the accompanying Drawing.

DETAILED DESCRIPTION OF THE PREFERRED EMBODIMENT

Figure 1:
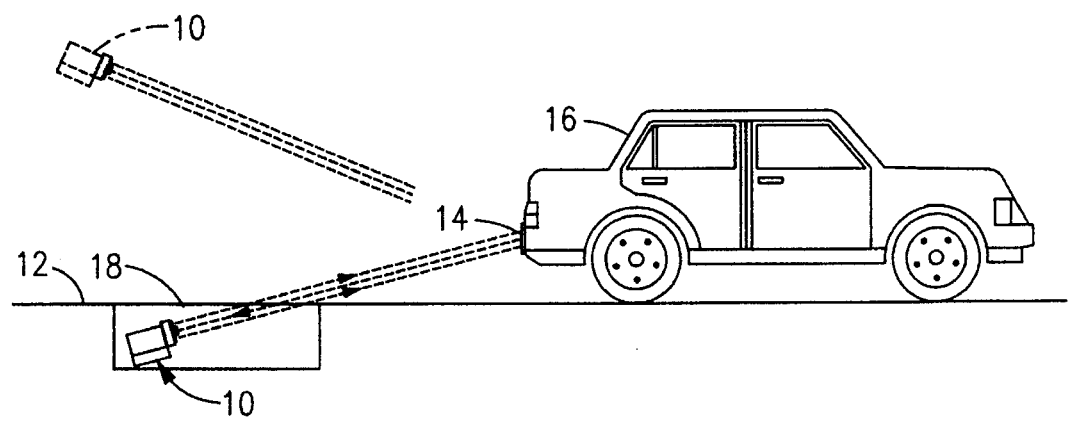
FIG. 1 is a schematic diagram of one application of the apparatus of the present invention.

With reference to FIG. 1, there is shown one application of apparatus 10 of the present invention. Apparatus 10 is mounted in a roadway 12 in a position to read optical information on a license plate 14 of a vehicle 16. In such an application, apparatus 10 would operate through a transparent window 18 in the roadway and would be substantially hidden from the driver of the vehicle. As shown in FIG. 1, apparatus 10 is mounted to direct a beam of radiation onto plate 14 at an angle of about 20 degrees when the apparatus 10 is spaced about 40 feet from the vehicle 16. The apparatus 10 could be placed above the rear of the vehicle 16, as shown in ghost lines, or could be placed to either side.

Apparatus 10 is described herein with regard to the reading of information on a vehicle license plate. However, it will be understood that the apparatus could also be used to read other optical information associated with a vehicle or other object.

Figures 2, 3:
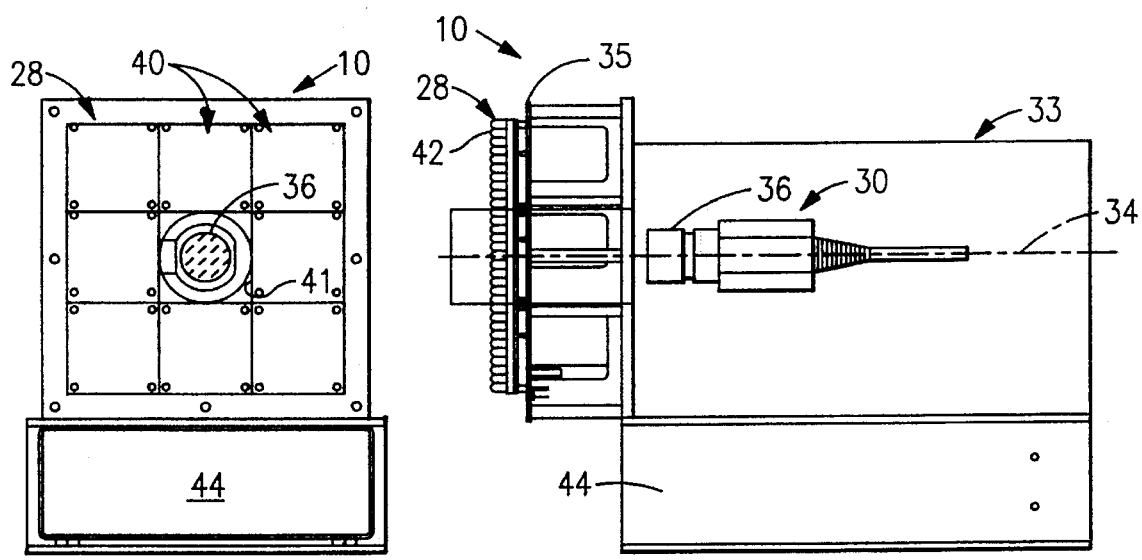
FIG. 2 is a front elevational view of the apparatus of the present invention.
FIG. 3 is a side elevational view of the apparatus shown in FIG. 2.
Figure 4:
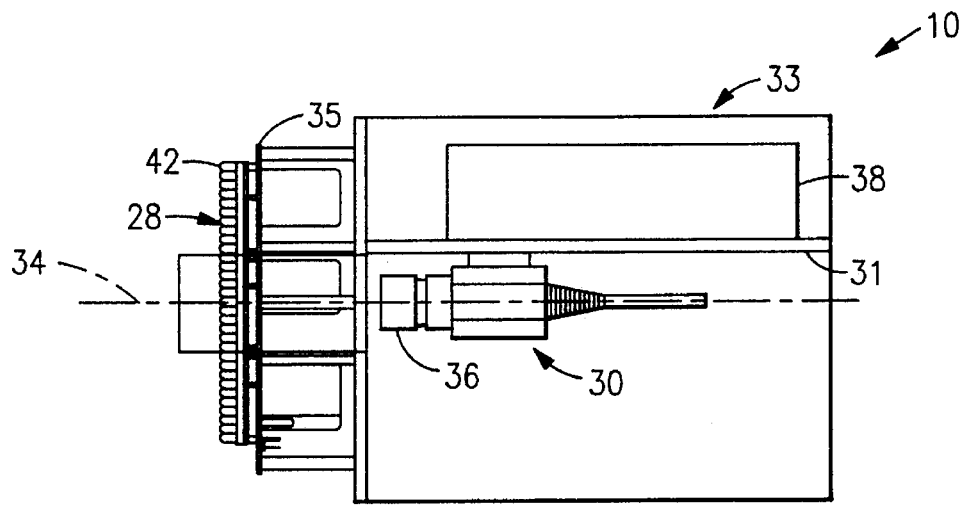
FIG. 4 is a top plan view of the apparatus shown in FIG. 2.

Apparatus 10, as shown in FIGS. 2, 3 and 4, comprises an illumination source 28 for projecting a beam of illuminating radiation onto a distant object such as a license plate, a camera 30, and an electronic control 32 (FIG. 5) for regulating the operation of apparatus 10.

Camera 30 is mounted on a wall 31 in a housing 33 of apparatus 10. Camera 30 includes an imaging lens 36 which is adapted to view the distant object, and receive radiation from the object, along an optical axis 34. Camera 30 can be of a type having an image sensor (not shown) which uses a charge-coupled device (CCD). Radiation reflected from the object is focused on the image sensor by lens 36, and an image is captured in the sensor through the conversion of incident light into charge signals. The charge signals from the image sensor are processed in a well-known manner to produce an electrical signal representative of the captured image. A power supply 38 for camera 30 is mounted on wall 31 at one side of housing 33, as shown in FIG. 4.

Illumination source 28 comprises eight LED arrays 40. The arrays 40 are mounted on a plate 35 which is fixed to a distal side of the housing 33 and is generally perpendicular to optical axis 34. As shown in FIG. 2, arrays 40 are arranged in a rectangular configuration with a central opening 41 which permits passage of the radiation reflected from the illuminated object to lens 36. Radiation source 28 is coaxial with optical axis 34 and lens 36 to provide substantially uniform illumination over the area on an object which is "seen" by camera 30. Each of the arrays 40 includes a plurality of LED's 42 arranged as shown in FIGS. 3 and 4. Each LED 42 emits radiation in the near infrared region between about 845 nm and about 915 nm and preferably at 880 nm. Since such radiation is not visible to the human eye, no light will be seen on an object when readings are being taken of information on the object.

A power supply 44 for radiation source 28 is mounted to a bottom part of the housing 33. Power supply 44 contains a pulse generator (not shown) which is adapted to strobe the LED's 42 at a predetermined frequency, for example, at the frame rate of camera 30 which is 30 Hz.

Figure 5:
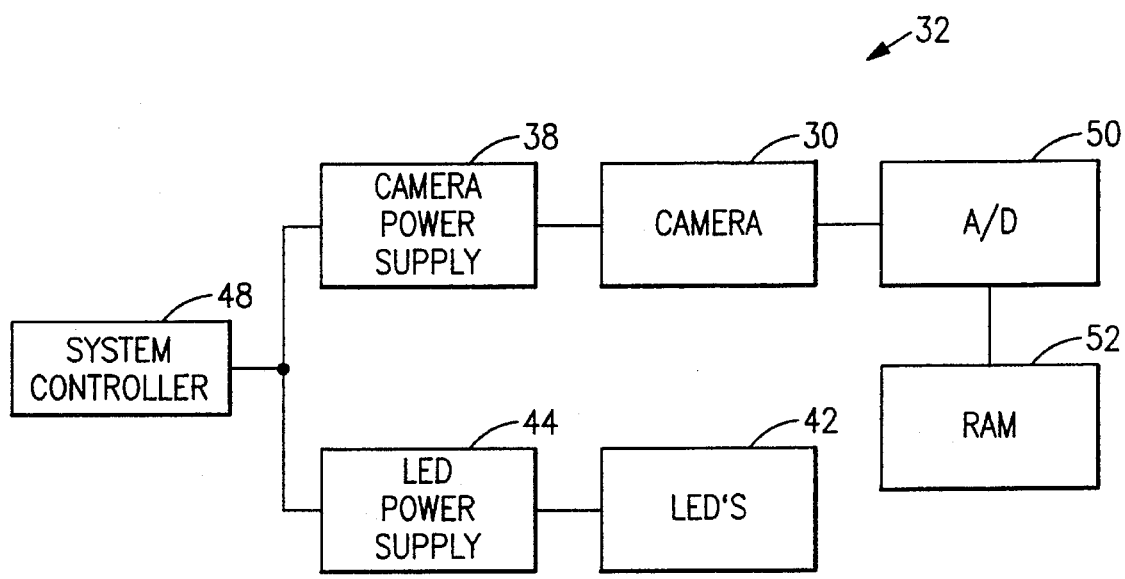
FIG. 5 is block diagram of the electronic control of the disclosed apparatus.

With reference to FIG. 5, a block diagram of the electronic control 32 for apparatus 10 is shown. Electronic control 32 comprises a system controller 48 which can be, for example, a microprocessor. In the use of the present invention for reading the a license plate of a vehicle, as shown in FIG. 1, the controller 48 would actuate camera power supply 38 and LED power supply 44 in response to a signal from a sensor (not shown) which signals the arrival of vehicle 16 in the correct position to be read. License plate 14 would be illuminated by source 28, and radiation from license plate 14 would be focused on the image sensor (not shown) of camera 30. Electrical signals representative of the optical information on plate 14 would be passed from camera 30 to an analog-to-digital (A/D) converter 50, and hence through other known processing circuitry. Digital signals from the A/D converter 50 can be stored in a memory 52, which can be a RAM (Random Access Memory), for future access, or the signals can be passed to an image display (not shown) for immediate viewing.

In one representative embodiment of the present invention when used as shown in FIG. 1, the LED's 42 emit radiation at 700 nm and above, either at a single wavelength, for example, 880 nm, or in multiple wavelength combinations. The camera 30 is a Cohu Model 6410 in which lens 36 is a 50 mm lens operating at f stop 5.6; the camera 30 is supported at an angle of 20 degrees with regard to horizontal and at a distance of 40 feet from the vehicle 16, and the strobe pulse width for LED's 42 is 500 microseconds. The strobe pulse width is not critical. From the foregoing description, it will be seen that apparatus of the present invention is particularly advantageous for applications where it is desired to read data from a vehicle, without detection by the vehicle operator. The apparatus is mounted in a self contained, compact unit which can be substantially hidden, and the radiation produced by the apparatus in not visible to the human eye. The solid state devices used in apparatus 10 can achieve a high mean time between failures (MTBF), and are therefore highly desirable for embedded applications, since little or no maintenance is required.

The pulsed operation of the LED's 42 permits the system to emit bursts of radiation of large intensity, but at a low average power consumption.

While the invention has been described with reference to a preferred embodiment, it should be recognized that the invention is certainly not limited to those embodiments, and many modifications and variations will become apparent to persons skilled in the art without departing from the scope and spirit of the invention, as defined in the appended claims.

We claim:

1. Apparatus for reading optical information contained on a distant object, said apparatus comprising:

a camera for receiving radiation from said object and for producing an electrical signal representative of said optical information, said camera having an imaging lens disposed on an optical axis extending through said apparatus;

an illumination source for projecting a beam of illuminating radiation along said axis and onto said object, said source being generally coaxial with said lens and including one or more two-dimensional arrays of LED's arranged about said optical axis, said LED's emitting invisible infrared radiation with a wavelength above 700 nm; and a power supply for said illumination source, said power supply including a means for strobing said LED's at a predetermined frequency.

2. Apparatus according to claim 1 wherein said LED's emit radiation in the near infrared range.

3. Apparatus according to claim 2 wherein said infrared range is between 700 nm and about 915 nm.

4. Apparatus according to claim 1 wherein said camera is a CCD camera having a frame rate on the order of 30 Hz.

5. Apparatus according to claim 4 wherein said frequency is equal to the frame rate as said camera.

6. Apparatus according to claim 1 wherein said power supply strobes all said LED's simultaneously.

7. Apparatus for reading optical information contained on a distant object, said apparatus comprising:

a housing having an opening at one end;

a camera mounted within said housing, said camera having an imaging lens disposed along an optical axis extending through said opening;

an illumination source mounted at one end of said housing, said illumination source being coaxial with said imaging lens; and a power supply for said illumination source, wherein said illumination source includes a plurality of LED's operating in the near infrared region of the electromagnetic spectrum, and the LED's are arranged in a generally rectangular configuration having an opening along said optical axis.

8. Apparatus according to claim 7 wherein said camera has a predetermined frame rate, and said power supply strobes said illumination source at said frame rate.

9. Apparatus according to claim 7 wherein said plurality of LED's are arranged as a group of arrays of LED's, with each said array having said LED's arranged in a two-dimensional configuration.

10. Apparatus according to claim 8 wherein said power supply for the illumination source includes a pulse generator for strobing said LED's.

11. Apparatus according to claim 7 wherein said LED's are disposed in a plane generally perpendicular to said optical axis.

12. A method of recording optical information contained on a vehicular license plate, said method comprising the steps of:

positioning a camera along an optical axis which extends from an imaging lens of said camera to the license plate;

illuminating said license plate with strobed radiation in the near infrared region of the electromagnetic spectrum by simultaneously strobing a plurality of arrays of infrared LED's arranged in a configuration which is coaxial with the lens of said camera;

actuating said camera to produce an electrical signal representative of optical information on said license plate; and passing said signal through processing means to a digital storage device.

13. The method of claim 12, wherein said step of illuminating with radiation in the near infrared region includes producing said illumination at a wavelength between about 845 nm and 915 nm.

* * * * *